2,999,111
RECOVERY OF 6-DEOXY-6-DEMETHYL-TETRACYCLINE

Charles R. Stephens, Jr., Niantic, Conn., assignor to Chas. Pfizer & Co., Inc., New York, N.Y., a corporation of Delaware
No Drawing. Filed Sept. 30, 1959, Ser. No. 843,357
7 Claims. (Cl. 260—559)

This invention relates to an improved process for obtaining useful antimicrobial agents. More particularly, it is concerned with a novel method for the recovery of such agents as 6-demethyl-6-deoxytetracycline and its acid addition salts from the reaction mixtures formed when the corresponding 6-oxy compounds are hydrogenated.

In accordance with the prior art, tetracycline, chlortetracycline and oxytetracycline have all been found to be valuable antibiotics which possess a high degree of antimicrobial activity. As a matter of fact, these particular compounds are all commercially available as useful therapeutic agents for the treatment of infectious diseases. More recently, it was found that certain 6-demethyltetracyclines are also useful as antimicrobial agents in addition to possessing the further advantage of being more stable than the parent tetracyclines from which they are derived. These findings were later extended to 6-demethyl-6-deoxytetracycline which is obtainable by the catalytic hydrogenation of either 6-demethyltetracycline or 6-demethylchlortetracycline.

In the past, it has been the common practice to isolate products of the foregoing type from their reaction mixtures by first removing the hydrogenation catalyst by means of filtration and then either evaporating the resulting solvent filtrate to dryness under reduced pressure or, if the chosen solvent is water-miscible, adding water to the filtrate and adjusting to a suitable pH in order to obtain the amphoteric 6-deoxytetracycline product as a solid precipitate. Alternatively, the common acid addition salts of these particular antibiotics, such as the hydrochloride, could be obtained if the corresponding tetracycline salt was employed as the starting material in the hydrogenation step or if a chlortetracycline antibiotic was similarly used as the initial substrate. However, these recovery methods have a number of common difficulties: for instance, the initial precipitation step is often time-consuming; the yields of product obtained are low; and it is usually rather difficult to isolate the desired compound in pure form.

A primary object of the present invention is to provide an improved process for obtaining 6-demethyl-6-deoxytetracycline in high yield and at a low cost. Another object of the invention is to provide a method for the recovery of such a compound and its common acid addition salts which will allow for a remarkably efficient ease of operation, thereby serving to further increase the economic feasibility of the process. Other objects and advantages of the present invention will be apparent to those skilled in the art from the description which follows.

In accordance with the present invention, the foregoing objects have now all been accomplished by the unexpected discovery that the acid sulfate addition salt of 6-demethyl-6-deoxytetracycline is exceedingly insoluble in such polar organic solvents as the lower alkanols and the lower alkoxy derivatives thereof, thereby providing a basis for isolating said compound from hydrogenation liquors which consist essentially of these type solvents. Moreover, the acid sulfate addition salt of 6-demethyl-6-deoxytetracycline is obtainable in this manner in a highly pure crystalline form and in substantially high yields, and it can be easily converted to the corresponding amphoteric antibiotic base or to other useful salts thereof by means of standard methods well-known to those skilled in the art. Among the manifold advantages afforded by the novel recovery method of the present invention are the following: yields of 6-demethyl-6-deoxytetracycline acid sulfate ranging from 30–40% are obtainable as compared with the 15% yields obtained in the case of the corresponding hydrochloride; the only reagent employed, viz., concentrated sulfuric acid, is well-known commercially and it is relatively inexpensive; control of reaction conditions is relatively simple and there is no need for expensive equipment; and finally, the acid sulfate salt so obtained is readily converted to the corresponding amphoteric 6-demethyl-6-deoxytetracycline base in almost quantitative yields or to other desired salts as hereinafter indicated.

In accordance with the process of this invention, a 6-demethyltetracycline antibiotic compound such as those which can be prepared in accordance with the procedure described by J. R. D. McCormick et al. in the August 20, 1957 issue of the Journal of the American Chemical Society, vol. 79, p. 4561, is subjected to the catalytic hydrogenation procedure of the present inventor and L. H. Conover as disclosed in their co-pending U.S. Patent application Serial No. 691,791, filed October 23, 1957, provided that the alcoholic solvent employed for the reaction is chosen from the group consisting of lower alkanols and lower alkoxyalkanols and preferably from those of the aforesaid type which contain up to five carbon atoms in their molecular structure. Preferred lower alkanols in this connection would, of course, include methanol, ethanol, isopropanol, n-butanol, and the like, while preferred lower alkoxyalkanols include such hydroxyalkyl ethers as β-methoxyethanol, β-ethoxyethanol, β-(β-methoxy)ethoxyethanol, and so forth. The alcoholic solution of the antibiotic product so obtained is then filtered in order to remove the catalyst, and the resulting filtrate is contacted with a sufficient amount of concentrated sulfuric acid so as to form the desired acid sulfate addition salt of the aforementioned 6-demethyl-6-deoxytetracycline amphoteric base, i.e., it is treated with at least an equimolar amount of concentrated sulfuric acid. The latter product crystallizes from the alcoholic solution in a highly pure form, especially with the aid of gradual cooling, and it is collected by means of filtration and subsequently washed with fresh solvent or, for that matter, with any other suitable organic solvent such as, for example, acetone or methyl isobutyl ketone.

In accordance with a more specific embodiment of this novel recovery method, an alkanolic or alkoxyalkanoic solution of the 6-demethyl-6-deoxytetracycline base or its hydrochloride is treated with at least an equimolar amount of concentrated sulfuric acid to form the desired acid addition salt, although a slight excess of reagent is not harmful in this respect and is, in fact, desirable since such an excess of sulfuric acid will tend to decrease the solubility of the acid sulfate salt, thereby aiding the precipitation step. In practice, it is most convenient to employ from about 0.1 to about 0.3 part by volume of the acid with respect to about one part by weight of the antibiotic compound. In general, the acid sulfate salt formation reaction is ordinarily conducted at room temperature, although any temperature in the range of from about 5° C. to about 50° C. can be employed. Moreover, constant agitation is maintained throughout the acid addition step as well as for an additional period of time thereafter, say, for example, from about one-half to about four hours, although the latter is not absolutely necessary. Crystallization of the desired acid sulfate salt from this solution usually commences almost at once or at least very rapidly, and it can be further effected by prolonged agitation of the mixture at ice-cold temperatures, i.e., at approximately 0–10° C. until precipitation of the crystalline material is complete. The material so obtained is filtered and washed with a suitable organic solvent as previously indicated and preferably with one that was employed in the hydrogenation step.

The pure crystalline 6-demethyl-6-deoxytetracycline acid sulfate addition salt obtained in accordance with this invention may be used advantageously for the preparation of the highly-active amphoteric 6-demethyl-6-deoxytetracycline base and common acid addition salts thereof. For instance, by dissolving 6-demethyl-6-deoxytetracycline acid sulfate in water and adjusting the pH of the resulting aqueous solution to a value that is in the 4.5–7.5 pH range with dilute sodium hydroxide, the corresponding amphoteric antibiotic base is liberated and subsequently crystallizes from solution. Inasmuch as this particular product is an amphoteric compound just as are the parent tetracycline antibiotics, it is possible to prepare a wide variety of acid addition salts by merely treating 6-demethyl-6-deoxytetracycline with various acids and bases in accordance with standard procedures previously disclosed in the literature and hence, well-known to those skilled in the art to which this subject matter pertains.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

A mixture consisting of 40 g. of 6-demethylchlortetracycline hydrochloride suspended in 400 ml. of technical grade methanol was treated with 24 g. of a 5% palladium-on-carbon catalyst (50% wet with water). The resulting mixture was then placed in a standard catalytic hydrogenation apparatus such as that described on p. 61 of Organic Syntheses, collective vol. I, second edition, John Wiley & Sons, Inc., N.Y. (1948), and subjected to a pressure of 100 p.s.i. of hydrogen at 40° C. while being constantly agitated. After the initial drop in pressure due to the absorption of gas by the catalyst and solvent, there was obtained a steady fall in pressure due to the hydrogenation of the substrate until about two moles of the hydrogen had been absorbed (this step required approximately ten hours). At this point, an assay of a sample of the reaction solution revealed the absence of any starting material or 6-demethyltetracycline therein. The catalyst was then removed by means of filtration, and the resultant filtrate treated with 10 ml. of concentrated sulfuric acid and stirred at 25° C. for two hours and then at 5° C. for an additional two hours. The resultant crystalline slurry was filtered and washed with cold methanol and then with acetone. In this manner, there was obtained at 30% yield of 6-demethyl-6-deoxy-tetracycline acid sulfate.

This product was then converted to the corresponding amphoteric anti biotic per se by dissolving said salt in water, adjusting the pH of the resulting aqueous solution to 6.0 with dilute sodium hydroxide and then extracting the basic aqueous solution with n-butanol. The butanol layer so obtained was separated and subsequently dried over anhydrous sodium sulfate. After removal of the drying agent by means of filtration and subsquent concentration of the resulting filtrate under reduced pressure to a small volume, there was obtained amphoteric 6-demethyl-6-deoxytetracycline as a crystalline precipitate which was subsequently recrystallized from toluene to afford a product of analytical purity.

*Example II*

The procedure described in Example I is followed except that the starting material employed is 6-demethyl-tetracycline hydrochloride. In this case, only one mole of hydrogen was absorbed and the corresponding acid sulfate addition salt and amphoteric base respectively obtained proved to be identical in every respect with those reported in Example I.

*Example III*

The procedure described in Example I is followed except that other lower alkanols or lower alkoxyalkanols are each individually employed as the solvent medium in lieu of methanol with substantially the same results being obtained. Such alcohols of this type which have been successfully applied in this procedure are ethanol, isopropanol, n-butanol, β-methoxyethanol, β-ethoxy-ethanol and β-(β-methoxy)ethoxyethanol. In the case of isopropanol and n-butanol, the solvent is first saturated with water in order to obtain optimum results in the hydrogenation reaction and an azeotropic distillation of the alcoholic hydrogenation liquor is carried out under reduced pressure prior to the addition of the sulfuric acid.

*Example IV*

The procedure described in Example I is followed except that the methanolic hydrogenation liquor filtrate obtained after removal of the catalyst is evaporated to dryness under reduced pressure. A gram of the resultant crude residual material consisting essentially of 6-demethyl-6-deoxytetracycline hydrochloride was then suspended in 10 ml. of β-methoxyethanol with stirring and treated with 0.1 ml. of concentrated sulfuric acid in the manner of the aforementioned example. The slurry which formed was then warmed slightly with the aid of gentle heating so as to dissolve any solid, and the resulting solution was allowed to cool very slowly to room temperature. In this manner, the crystalline 6-demethyl-6-deoxytetracycline acid sulfate addition salt precipitated from solution in yields ranging from 0.3 to 0.5 g. In like manner, substantially the same results are obtained when any of the other solvents previously enumerated in Example III are each individually employed in this very same reaction procedure.

*Example V*

The procedure of Example IV is followed except that the amphoteric base obtained as described in Examples I and II, viz., 6-demethyl-6-deoxytetracycline is the starting material employed in this particular salt formation step. As in the previous example, the resultant acid sulfate addition salt is recovered in the form of a crystalline precipitate.

What is claimed is:

1. In the method of preparing a 6-demethyl-6-deoxytetracycline antibiotic compound from a corresponding 6-oxy compound selected from the group consisting of amphoteric 6-demethyltetracycline, amphoteric 6-demethylchlortetracycline and their acid addition salts by means of catalytic hydrogenation in a reaction-inert alcoholic solvent chosen from the group consisting of lower alkanols and lower alkoxyalkanols, the step which comprises recovering the 6-demethyl-6-deoxytetracycline antibiotic compound from said alcoholic hydrogenation liquor by contacting said compound in said liquor with at least an equimolar amount of concentrated sulfuric acid to form the corresponding acid sulfate addition salt and crystallizing the so produced 6-demethyl-6-deoxytetracycline acid sulfate addition salt from the alcoholic solution.

2. The method of recovery as claimed in claim 1 wherein the 6-demethyl-6-deoxytetracycline acid sulfate addition salt is crystallized from methanol.

3. The method of recovery as claimed in claim 1 wherein the 6-demethyl-6-deoxytetracycline acid sulfate addition salt is crystallized from ethanol.

4. The method of recovery as claimed in claim 1 wherein the 6-demethyl-6-deoxytetracycline acid sulfate addition salt is crystallized from isopropanol.

5. The method of recovery as claimed in claim 1 wherein the 6-demethyl-6-deoxytetracycline acid sulfate addition salt is crystallized from n-butanol.

6. The method of recovery as claimed in claim 1 wherein the 6-demethyl-6-deoxytetracycline acid sulfate addition salt is crystallized from β-methoxyethanol.

7. The method of recovery as claimed in claim 1 wherein the 6-demethyl-6-deoxytetracycline acid sulfate addition salt is crystallized from β-ethoxyethanol.

References Cited in the file of this patent

UNITED STATES PATENTS 2,871,265   Reed et al. _____ Jan. 27, 1959